(12) United States Patent
Griffin

(10) Patent No.: US 12,222,564 B2
(45) Date of Patent: Feb. 11, 2025

(54) LASER-TO-OPTICAL-FIBER CONNECTION

(71) Applicant: Cyclone Biosciences, LLC, Phoenix, AZ (US)

(72) Inventor: Stephen E. Griffin, Peoria, AZ (US)

(73) Assignee: CYCLONE BIOSCIENCES LLC, Phoenix, AZ (US)

( * ) Notice: Subject to any disclaimer, the term of this patent is extended or adjusted under 35 U.S.C. 154(b) by 0 days.

(21) Appl. No.: 17/847,608

(22) Filed: Jun. 23, 2022

(65) Prior Publication Data

US 2023/0023074 A1 Jan. 26, 2023

Related U.S. Application Data

(60) Provisional application No. 63/225,812, filed on Jul. 26, 2021.

(51) Int. Cl.
*G02B 6/42* (2006.01)
(52) U.S. Cl.
CPC ................................. *G02B 6/4206* (2013.01)
(58) Field of Classification Search
USPC .......................................................... 385/33
See application file for complete search history.

(56) References Cited

U.S. PATENT DOCUMENTS

| | | | |
|---|---|---|---|
| 6,282,346 B1 | 8/2001 | Richter et al. | |
| 6,324,326 B1 | 11/2001 | Dejneka et al. | |
| 6,788,864 B2 * | 9/2004 | Ahmad | G02B 6/02304 |
| | | | 385/123 |
| 7,090,411 B2 | 8/2006 | Brown | |
| 7,309,167 B2 | 12/2007 | Stephen | |
| 7,488,116 B2 | 2/2009 | Steve | |
| 7,699,535 B2 | 4/2010 | Griffin | |
| 8,622,625 B2 * | 1/2014 | Benjamin | G02B 6/25 |
| | | | 385/72 |
| 9,122,009 B1 | 9/2015 | Griffin | |
| 9,223,089 B1 | 12/2015 | Griffin | |
| 10,082,630 B1 * | 9/2018 | Hsia | G02B 6/14 |

(Continued)

FOREIGN PATENT DOCUMENTS

CA 2248912 A1 * 9/1997
JP H07311323 A * 11/1995

(Continued)

*Primary Examiner* — Kaveh C Kianni
(74) *Attorney, Agent, or Firm* — Quarles & Brady LLP; Yakov S. Sidorin

(57) ABSTRACT

An article of manufacture including a fiber optic termination of a small core optical fiber for use with a surgical laser (characterized by a high $M^2$ factor) or other high-power or high-energy pulse laser is configured for safe and efficient coupling of light at a large laser focal point and/or to enable the process of coupling of radiant intensities exceeding the silica fiber damage thresholds and/or those ionizing the air if fully focused therein. The termination includes a glass cylinder structured to include a core region and a glass cladding region the ratio of dimensions of which is substantially equal to the ratio of respectively-corresponding dimensions of the employed optical fiber. A method of coupling laser light characterized by an $M^2$ factor of 25 or higher into an optical fiber with the use of same.

19 Claims, 7 Drawing Sheets

(56) References Cited

U.S. PATENT DOCUMENTS

| | | | |
|---|---|---|---|
| 2003/0021301 A1* | 1/2003 | Vahala | H01S 3/30 372/3 |
| 2006/0042321 A1* | 3/2006 | Lewis | G02B 6/262 65/378 |
| 2006/0072875 A1* | 4/2006 | Bhagavatula | G02B 6/29332 385/30 |
| 2009/0304551 A1* | 12/2009 | Mutharasan | G01N 21/7703 422/82.11 |
| 2010/0247047 A1* | 9/2010 | Filippov | C03B 37/02763 385/127 |
| 2012/0127563 A1* | 5/2012 | Farmer | G02B 6/14 359/341.3 |
| 2012/0219026 A1* | 8/2012 | Saracco | G02B 6/14 372/21 |
| 2012/0262781 A1* | 10/2012 | Price | H01S 3/06754 359/341.3 |
| 2013/0011102 A1* | 1/2013 | Rinzler | G02B 6/262 385/94 |
| 2013/0236153 A1* | 9/2013 | Rochette | C03B 37/15 83/13 |
| 2016/0327748 A1* | 11/2016 | Stern | G02B 6/305 |
| 2017/0135765 A1* | 5/2017 | Griffin | G02B 6/0003 |
| 2018/0045895 A1* | 2/2018 | Lee | G02B 6/14 |
| 2018/0067259 A1* | 3/2018 | Teng | G02B 6/30 |
| 2018/0120504 A1* | 5/2018 | Qi | G02B 6/3636 |
| 2019/0265416 A1* | 8/2019 | Otfried Brusberg | G02B 6/12016 |
| 2021/0330383 A1* | 10/2021 | Griffin | G02B 6/0003 |
| 2022/0229225 A1* | 7/2022 | Guan | G02B 6/02076 |
| 2023/0098658 A1* | 3/2023 | Watté | G02B 6/305 385/33 |

FOREIGN PATENT DOCUMENTS

| | | | | |
|---|---|---|---|---|
| JP | 3267992 B2 | * | 3/2002 | B82Y 15/00 |
| WO | WO-02084362 A1 | * | 10/2002 | B29D 11/00721 |

* cited by examiner

LASER-TO-OPTICAL-FIBER CONNECTION

CROSS-REFERENCE TO RELATED APPLICATIONS

This US patent application claims priority from and benefit of the U.S. Provisional Patent Application No. 63/225,812 filed on Jul. 26, 2021, the disclosure of which is incorporated by reference herein.

TECHNICAL FIELD

This invention relates to fiber-optic terminations configured to radiatively couple optical fibers to surgical lasers (e.g., holmium lasers, CTH:YAG, and Ho:YAG lasers, for example) and/or other laser sources generating low-$M^2$ (low beam quality factor) laser output such as to efficiently couple such low-quality but high intensity radiant output into the optical fibers. The discussed terminations may facilitate coupling of high-energy laser pulses to optical fibers with such core diameters that otherwise require exceeding the breakdown threshold level for ambient air or the damage threshold of the fiber-optical surface. (To that end, the use of the embodiments of the invention avoids and/or prevent such breakdown.)

RELATED ART

Holmium lasers primarily find application in urology and, specifically, for vaporization and enucleation of hyperplastic prostate tissue (BPH) and breaking apart kidney stones (although additional applications exist for both soft and hard tissue targets). These infrared lasers typically produce 0.2 Joule to 6 Joule pulses with 350 µs to 1200 µs pulse width at a rates from about 5 pulses per second (pps) to about 120 pps at wavelengths ranging from about 2.08 µm to about 2.14 µm, with average powers ranging from about 8 W to about 140 W.

A skilled person understands that light outputs generated by holmium lasers are spatially multimode and of particularly low quality, which is reflected in a low $M^2$ factor or parameter. (The $M^2$ factor of a laser beam also referred to as a beam quality factor or beam propagation factor, is a common measure of the beam quality of a laser beam and is known in related art to represent the degree to which the light beam can be focused for a given beam divergence angle. A diffraction-limited beam such as a Gaussian beam, for example, has an $M^2$ factor of 1. A typical value of $M^2$ for a surgical laser such as a holmium laser is at least several tens, sometimes less than 50, but when such laser is overheated—which is a common occurrence—the $M^2$ value can reach triple digits: thermally-induced refractive index gradients and birefringence in holmium laser rods distort the laser output, both beam diameter and divergence drift during use/operation of a given laser, and myriad spatial modes are generated.) Higher-power holmium lasers employ two or more laser heads the outputs from which are combined to produce the total laser output, which further reduces the beam quality. Furthermore, surgical lasers are routinely repositioned and subjected to jolts and bumps in hospital corridors, freight elevators, thresholds, etc., which detrimentally affects the degree of adjustment of constituent parts of the lasers: this leads to the need to keep the corresponding focusing optics as robust and simple as possible. Structurally simple optics, used in combination with poor quality laser power output, produce focal spots that are atypically large, misshapen, unstable, and vary widely in parameters not only from manufacturer to manufacturer but even throughout a given laser's lifetime and even within a single surgical session. (Indeed, nominal laser focal spot diameters are often defined at a $1/e^2$—level of maximum of a semi-Gaussian irradiance profile, such that about 14% of the laser output energy lies outside of the nominal spot diameter. Pulses produced at the beginning of a given session—that is, from cold laser media—typically have higher energy than subsequent pulses, but as the laser medium heats with use the pulse foci balloon and may drift.)

High-energy infrared laser pulses vaporize most of the materials (from polymers to metals) that are used in producing fiber-optic coupling structures devised to have such light pulses coupled to the optical fibers. Optical fiber terminations that are coupled to holmium lasers are routinely damaged by misalignment between the fiber core and the laser. Once damaged, such fiber couplings may in turn case damage to the laser optics. For example, lenses or "blast shields" (protective AR-coated windows often used with the holmium lasers) are pitted or coated with organic and inorganic debris, thereby further reducing the operational performance, whether subtly or dramatically. Subtle damage routinely goes unrecognized until accumulation of such damage with time results in catastrophic failure of the laser optics (such as blast shields, lens, mirrors, rods) or the optical fibers themselves, at the point of interconnection between a laser source and the fiber (that is, at the optical fiber termination) or even meters away (for example, at a location within the patient).

Designs of optical fiber termination structures or couplings (interchangeably referred to herein as OF terminations or fiber terminations) known from related art are directed to surviving a significant fiber core overfill when a corresponding optical fiber is coupled to the laser source (and include, for example, the contraptions in which the overfill energy is spatially filtered and typically reflected, scattered or absorbed). Some related-art implementations seek to capture at least some of the fiber core overfill energy within the fiber core with the use of tapered input sections (where the fiber core is larger at the input face of the optical fiber unit) and others claim to reduce or eliminate light coupling to the cladding, to the exclusion of or in addition to the core.

Related art often fails to consider the problems associated with the relatively high attenuation of light at a wavelength of about 2,100 nm in silica-silica optical fibers (which attenuation is highly dependent upon the interactions of evanescent optical field with the optical fiber cladding(s), while such interactions, in turn, are dependent upon the angular spectrum of the spatial mode population within the fiber). Typical silica-silica optical fiber attenuation ranges from about 1% to about 3% per meter of fiber length for core modes, while cladding modes are attenuated at roughly 10% to 15% per meter (which largely depends upon the refractive index, thickness, and transparency at 2,100 nm of polymers used as "secondary cladding" materials). Much of the energy that is lost to attenuation leaks from the fiber, into the polymer cladding and protective jacket. Fibers fail catastrophically when this leaked energy has radiant intensity sufficient to melt or burn the polymer layers surrounding the silica-silica fiber: a phenomenon that is referred to in the laser surgery field as a "burn through".

A skilled artisan should be additionally aware of losses caused by microbending due to defects at the silica-core-to-silica-cladding interface are introduced during fiber preform production. Additionally, loss-causing microbending is created by defects at the silica-cladding-to-polymer-cladding interface, by stresses induced by the jacketing (typically EFTE) shrinkage during extrusion, by fiber-jacket-to-secondary-clad bonding, and by dimensional variations in the core that are introduced during fiber draw. While a surgical-laser-fiber designer may be able to control, at least to some degree, contributions to transmission losses (for example, by selecting the best base fiber material to work with, establishing strict dimensional limits for core and claddings, and/or selecting among available polymer claddings), in the case of smaller and more flexible surgical laser fibers, insufficient cladding thickness continues to be a significant source of attenuation due to surgical access constraints imposed on overall diameter and stiffness of such fibers.

Fiber cladding modes suffer greater attenuation than low-order core modes and predispose a laser fiber to burn through failure. In striving to produce fiber terminations that survive spatial overfill of the fiber core, most recent holmium laser fiber designs introduce new sources of cladding mode excitation. To this end, FIG. 1 illustrates two causes of cladding mode excitation in holmium laser fibers resulting from fiber termination defects. FIG. 1A depicts a fiber 105 where the fiber axis 110 is tilted with respect to the axis 115 of the laser beam 125 (focused with the lens 120) such that the fiber acceptance cone α is misaligned with the laser focus cone θ. FIG. 1B depicts an optical fiber 145 with a fiber face or facet 130 polished at an angle such that the fiber facet plane 135 is not orthogonal to the converging laser beam axis 115. (Note, that the axis 110 of the fiber and the axis 115 of the laser beam are substantially coincident). As a result, the acceptance cone α of the fiber 145 is misaligned with respect to the cone θ of the focused laser beam. A skilled person will readily appreciate that additional alignment errors are also practically inevitable in surgical laser fiber terminations due to eccentricities of fibers within the laser connectors (typically SMA 905) and pitch within the connector bore.

Some excitation of cladding modes (that is due to or caused by the laser performance or damaged optics) can only been mitigated by an appropriate design of a fiber termination. This is the case, for example, of what is known in the art as beam blooming, which generally increases the fill factor of optical located down the beam (considered now in reference to FIG. 2). In current context, the effect of beam blooming is generally the result of thermal gradients within the laser due to internal heat dissipation limitations, but some prior art fiber terminations amplify this problem by reflecting a portion of the laser energy back into the laser cavity, further destabilizing the laser medium or even pitting the rod face. FIG. 2A depicts a nominal holmium laser focus where the lens 50 is selected to focus a nominal output 75 of the laser rod at the focal plane 55 such that the focal spot diameter 60 is smaller than the core 65 of the fiber 70 and the focal cone angle θ is lower than the minimum acceptance cone α of the fiber 70. When holmium laser rods heat unevenly, the refractive index of the rod changes non-uniformly, producing a variable, and typically larger, diameter beam. FIG. 2B depicts the laser focus of FIG. 2A where the output 80 of the laser rod has "bloomed" (or increased in diameter from the value corresponding to the beam 75 of FIG. 2A to that corresponding to the larger beam 80) due to thermal lensing such that it fills more (a larger area) of the focusing lens 85, thereby causing the angle of convergence of the laser beam on the other side of the lens to increase from θ to $\theta_1 > \theta$, thereby overfilling the angle α of the fiber acceptance cone and causing the focal spot to increase in diameter (from 60 of FIG. 2A to 90).

Where the laser output blooms, the numerical aperture NA of the fiber meridional mode may be overfilled, as is schematically illustrated by FIG. 2B, but because the fiber core is chosen to be larger than the nominal diameter of the laser focal spot diameter, the fiber core is not spatially overfilled. In practice, unfortunately, the overfilling of the fiber acceptance angle goes unnoticed in most cases because the polymer coating over the fiber's glass cladding is able to weakly guide the angular overfill, but should such fiber be subjected to bending stress (e.g. by the surgeon's wrapping the fiber about his hand to gain a good grip; or by the fiber bending at the cystoscope working channel port, or just distal to the laser connection) higher-order spatial modes will be immediately transformed or converted to cladding modes that are poorly guided, thereby degrading the polymer cladding in a cascade of failure that typically ends catastrophically.

FIG. 3 illustrates the situation when a fiber 350, having a substantially constant core diameter and a polymer cladding 350A has characteristics that do not allow such fiber accept a ray of light 320 arriving adjacent to the input facet of the fiber at an angle of about $10^0$ with respect to the fiber axis. To address this problem, the fiber 350 may be complemented with (for example, grown on or fused with) a down-tapered polymer-cladding-free input section 305 of the optical fiber into which the input laser light—schematically illustrated by a ray 320—is coupled, and mode conversion (mode promotion) that occurs inside the tapered fiber section 305 (illustrated here by neglecting refraction at the air-glass interface for simplicity of illustration). Here, a higher-order focal mode of laser light 320 is shown to be coupled into the tapered fiber section 305 at an angle that is measured with respect to the axis 305A of the section 305 and that is below the maximum acceptance cone angle of the fiber (here, about 12.7°). The light 320 is reflected within the taper 305 at the core-cladding interface at a location 330 and are raised in angle of propagation, by the taper half angle, by 2.5° to 12.5° (that is, continues to propagate at a higher angle with respect to the axis 305A). When the so-promoted rays encounter the taper wall for a second time (see location 335), the rays are again promoted in angle by 2.5° at the core-cladding interface. The resulting angle of about 15° in this example exceeds that corresponding to the silica-silica numerical aperture value such that, on a subsequent encounter with the taper wall (at location 340) the rays pass through the core-cladding interface. These rays are again reflected, but by the glass-air interface of the polymer-cladding free taper 305, and are promoted to 17.5° and finally to 20° just prior to entering the cylindrical fiber 350.

Tapered input fibers—such as that depicted in FIG. 3—are disclosed, for example, in U.S. Pat. Nos. 6,282,346; 7,309,167; and 7,699,535, all issued to Griffin. While such constructs are useful for coupling light from laser sources producing spatially-large output distribution of laser light to a small-core fiber, such coupling is accomplished with a concomitant cost of a reduced angular aperture. Here, where rays such as 320 would be guided by a fiber with a core diameter larger than that of the fiber 350 (assuming the base fiber has a NA 0.22 with an acceptance half angle of ~12.7° in air), when captured by the tapered input fiber section 305 the ray angle relative to the fiber longitudinal axis is increased by the fiber taper half angle at each encounter with the angled wall, in the case of FIG. 3, to 12.5° at 330, 15° at 335, 17.5° at 340, and 20° at 345.

Notably, employing tapered fiber constructs of FIG. 3 in reverse will convert higher order modes to lower orders only when the taper axial alignment is assured, and taper angles are lower than the highest order modes excited within the fiber core.

The so "propagation-angle-promoted" rays such as ray 320 of FIG. 3 120 are problematic in that they render the distal fiber 350 susceptible to burn through (when bent; as disclosed for example by Griffin in U.S. Pat. Nos. 9,122,009 and 9,223,089. Specifically, when the un-tapered fiber 350 is coated with a low refractive index polymer (shown as layer 350A), these high-order modes of light propagating at about 20° with respect to the axis of the fiber 350 will be guided as cladding modes until light in these modes is lost to attenuation, exits the distal tip of the fiber 350, or contributes to a burn through failure. U.S. Pat. Nos. 9,122,009 and 9,223,089 provide a particular solution to this problem manifesting in partial collimation of the higher angle rays to avoid mode promotion in the fiber taper. Collimation is accomplished by equipping the tapered fiber input with a convex lens element formed on the fiber surface itself as shown in FIG. 4.

FIG. 4 illustrates an approach facilitating a compensation for this mode conversion process towards the higher-angle excited modes. Here, the same higher-order spatial mode 320 is coupled into the down-tapered section 415 of optical fiber that exhibits a inwardly curved (convex) input surface or facet 455 forming, at the input 460 of the taper 415, a negative lens element refracting the input light 320 into the mode 430 propagating towards the regularly-dimensioned optical fiber 350 (which is merged with an output facet of the taper 415) such that the refracted mode 430 never encounters the taper wall 475, but instead reflects for the first time within the bounds of the fiber 350 at location 465. Using such a concave lens input, tapered input fiber section may perform as well as, or better than, many straight input fibers. However, even these types of OF terminations can contribute to excitation and conversion of cladding modes under more stressful conditions (such as, for example, beam blooming or scatter in damaged optics).

Other fiber termination strategies, e.g. that schematically depicted in FIG. 5, often also inadvertently result in launching cladding modes. U.S. Pat. No. 7,090,411 (to Brown) discloses a glass ferrule 535 surrounding a polymer denuded fiber 530 with unpolished (saw cut) glass faces 520 & 545 configured to act as light diffusers as well as internal multifaceted reflectors and reduced diameter input fibers. Such scattering elements, as exemplified by 520 and 545, scatter laser focal rays 510 with the bulk of the overfill energy being redirected toward polymer clad 550 and ETFE buffered 565 segments of the distal fiber such that very high order scattered modes may couple to the fiber core-cladding within the polymer-free segment proximal to 515 and become guided as cladding modes within the polymer clad fiber at 550.

Related art also presents a tapered fiber with a lens on the input surface (see lens surface 680, in FIG. 6 that represents a OF termination employing an accessory quartz ferrule 685 that is fused 690 about the taper 695 to produce a larger surface upon which to form a functional lens 680) are limited in function due to the sum of multiple variables such as the actual base fiber NA (typically+/−0.02), distance from on-fiber lens 680 to the bottom of the taper 675 (first distal point where the fiber core is unaltered), lens focal length, the linearity of the wall 695 of the taper 675. The uncertainties in these and other variables necessitate a focal length compromise that results in a less than optimum quasi-collimation in avoidance of overcorrection (where the beam waist occurs before the end of the taper such that an encounter with the taper wall is mode promoting).

Accordingly, there remains an unsatisfied industrial need in in fiber termination technologies avoiding or compensating for the above-discussed deficiencies.

SUMMARY

Embodiments of the invention include a method for coupling light into an optical fiber having a fiber glass core and a fiber glass cladding. The method includes a step of directing an input beam of laser light having an $M^2$ factor of 25 or higher in air to a front surface of an optical termination element cooperated with an input facet of the optical fiber (here, the optical termination element has a termination glass core and a termination glass cladding dimensioned such that a first ratio of a termination glass core diameter to a termination glass cladding diameter is substantially equal to a second ratio of the fiber glass core diameter to the fiber glass cladding diameter). The method additionally includes a step of converging—upon transmitting the input beam through the front surface—such input beam inside the optical termination element to form a converging beam while propagating said converging beam towards the input surface, as well as the step of coupling light from the converging beam into the optical fiber through the input surface.

Embodiments additionally include an article of manufacture that incorporates an optical fiber having a fiber glass core and a fiber glass cladding, and an optical termination element in contact with an input surface of the optical fiber (the optical termination element having a front surface, a termination glass core, and a termination glass cladding), where a first ratio of a termination glass core diameter to a termination glass cladding diameter is substantially equal to a second ratio of the fiber glass core diameter to the fiber glass cladding diameter. In a specific case, the article of manufacture satisfies at least one of the following conditions is satisfied: the optical termination element contains an optical lens element; the front surface of the optical termination element is a surface of the optical lens element; the article further comprises an auxiliary optical element affixed to the front surface of the optical termination element; and the front surface is a curved surface. In substantially any implementation, the article of manufacture may be configured with an optical termination element that has a length portion along which the first ratio is substantially constant.

BRIEF DESCRIPTION OF THE DRAWINGS

For a more complete understanding of the disclosure, reference should be made to the following detailed description and accompanying drawing figures, of which.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another. While specific embodiments are illustrated in the figures with the understanding that the disclosure is intended to be illustrative, these specific embodiments are not intended to limit the scope of invention implementations of which are described and illustrated herein.

DETAILED DESCRIPTION

The disclosure of each patent document and/or publication referred to in this application is incorporated herein by reference.

Embodiments of the present invention solve a persisting problem of inability of the systems of related art to effectively couple laser light where sufficiently-focused light either exceeds the damage threshold of the fiber and/or exceeds the ionization breakdown threshold of the medium (such as air, in one example) in which the process of coupling occurs. Notably, while rate of air ionization may depend on the wavelength of used light and/or a pulse duration, the thresholds for breakdown (for ~2 ns pulses in clean dry air at atmospheric pressure) were found to be in the power density range of $6*10^{11}$ W/cm$^2$ at 1064 nm; about $3*10^{11}$ W/cm$^2$ at 532 nm; and about $2*10^{12}$ W/cm$^2$ at 355 nm, which data provide a good assessment of the required levels for a single laser pulse. While repetition of pulses may lower the threshold, the laser damage thresholds are lower as well—and depending on a preparation of a surface the laser damage threshold may be as low as 104 W/cm$^2$.

Figure 1A:
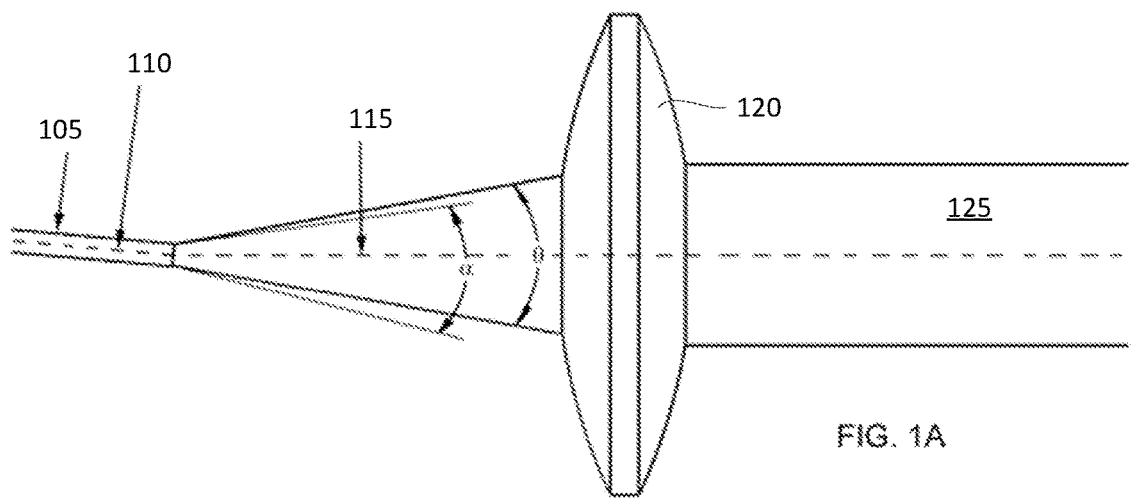
FIG. 1A and FIG. 1B illustrate schematically two typical causes of excitation of cladding modes in surgical fibers used with holmium lasers (~the holmium laser fibers), both resulting from defects in fiber termination defects often found in related art.
Figure 1B:
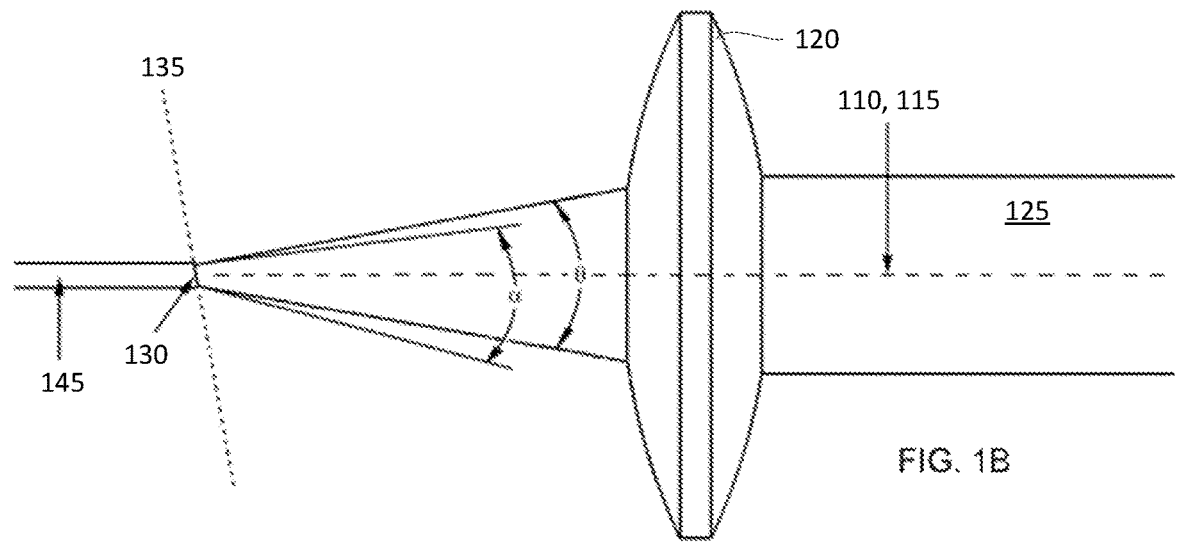
Figure 2A:
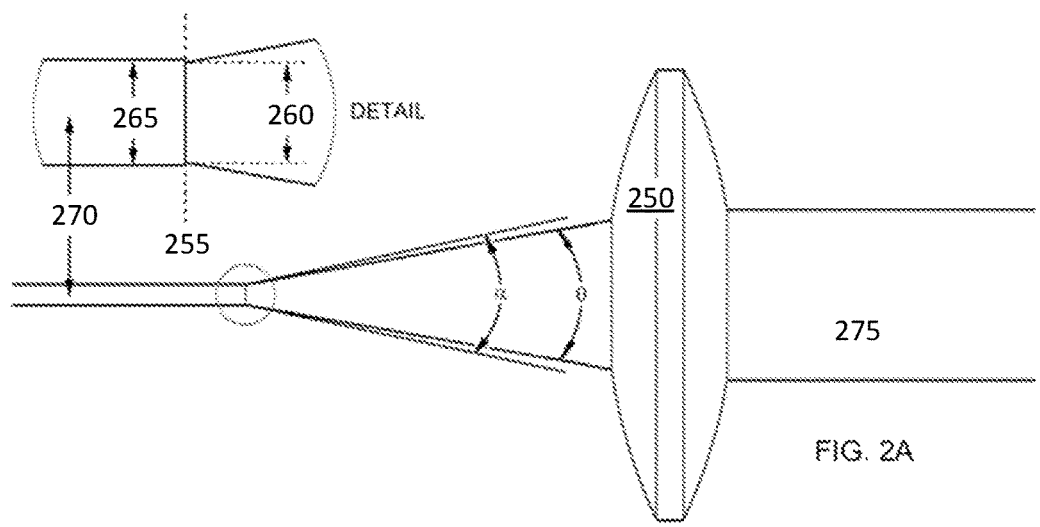
FIG. 2A and FIG. 2B illustrate schematically the effect of 'blooming" of the output beam generated by a typical holmium laser, and its effect on coupling into a surgical optical fiber.
Figure 2B:
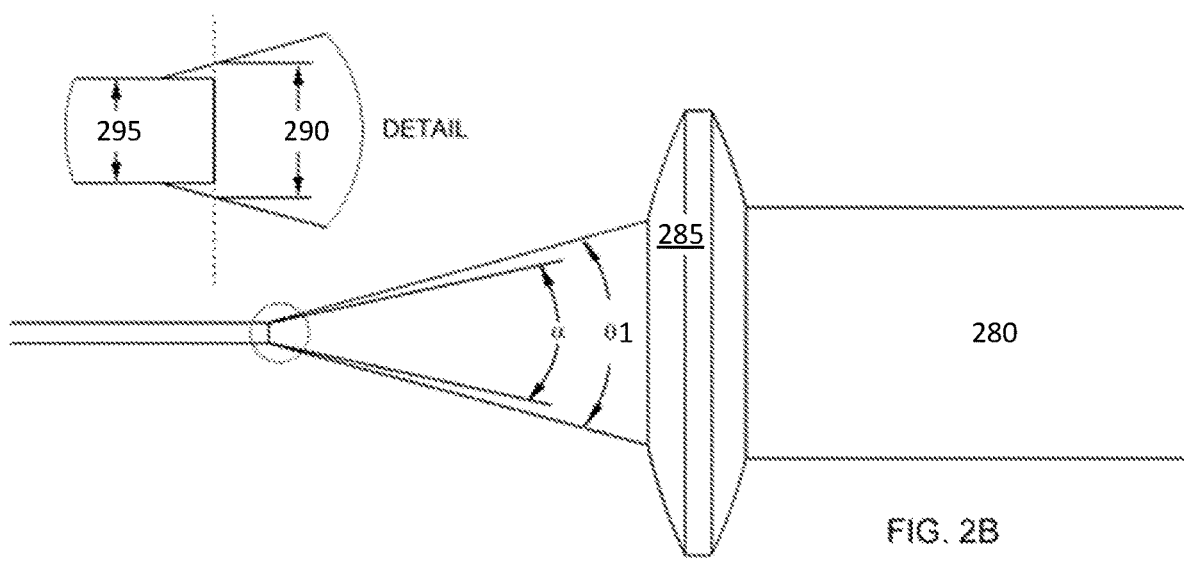
Figure 3:
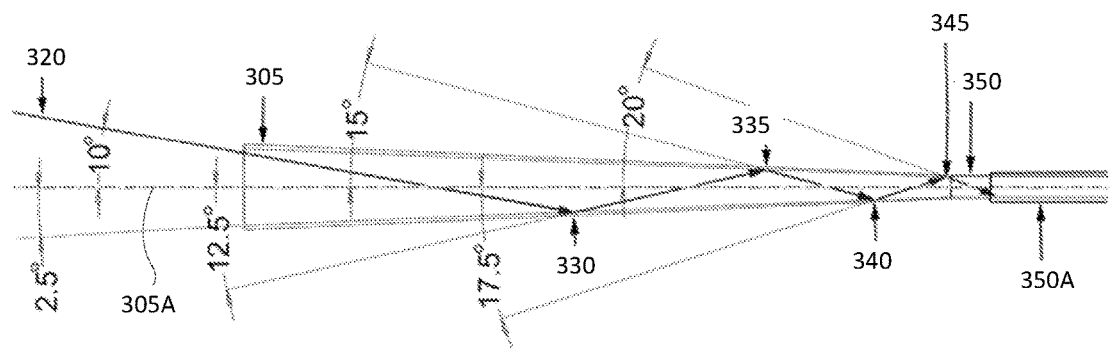
FIG. 3 presents a cross-section of a tapered segment of an optical fiber, showing the transformation of a high-order modes upon coupling to a fiber through such tapered segment.
Figure 6:
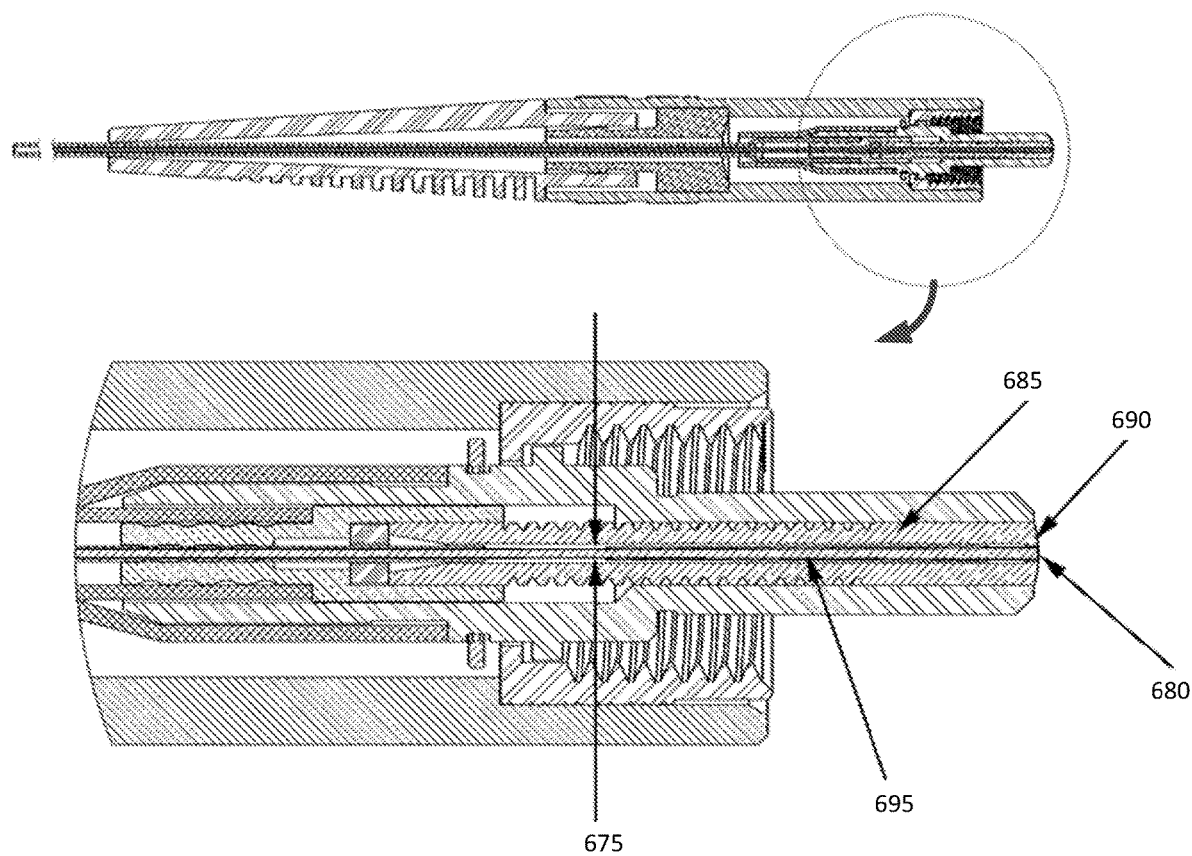
FIG. 6 depicts critical elements of a fiber optic termination discussed in U.S. Pat. Nos. 9,122,009 and 9,223,089.

Specifically, embodiments of the invention described here minimize technical uncertainties and variations in some prior art parameters while eliminating other uncertainties altogether, thereby permitting reproducible efficiency that has not been demonstrated so far. Specifically, in reference to the related art solutions outlined in reference to FIGS. 3 and 6, for example, longer fiber tapers are inherently superior for guiding overfill energy into the original fiber core and NA, while shorter tapers are preferable for targeting the original core position with the input lens. Formation, and positioning of tapers in ferrules for fusion are inherently variable, as is angular position of the taper within the ferrule bore, forcing compromise in lens parameters.

A skilled artisan will readily appreciate that—as used in this disclosure and the appended claims—the term "cladding modes" refers to light propagating within the optical fiber that is not guided within the space defined by the glass-core boundary and the -glass-cladding boundary (that is, the light guided within the bounds of the glass cladding layer of the optical fiber) but, instead, is guided within a space defined between the boundary of the glass body of the optical fiber and the boundary of the polymer cladding of the fiber, regardless of the source of light. Multimode fibers that are used in holmium-laser-based surgery procedures are typically step-index and "doubly clad" fibers, in which the glass cladding layer is coated with a fluoropolymer coating having a refractive index lower than that of the fluorine-doped (F-doped) silica glass cladding of the fiber. A secondary numerical aperture (NA) of such fibers—of approximately 0.30 to 0.45—is thus formed by such polymer coating (polymer cladding, often referred to as "secondary cladding"). These fibers may be additionally buffered (or "jacketed") with a relatively thick layer of a polymer, typically ethylene tetrafluoroethylene (ETFE) copolymer (refractive index of about 1.4 @ 633 nm) that is dyed blue or green to form what is often referred to as a "jacket layer" (or jacket, for short) with enhanced visibility, which is important in the surgical field.

Figure 7:
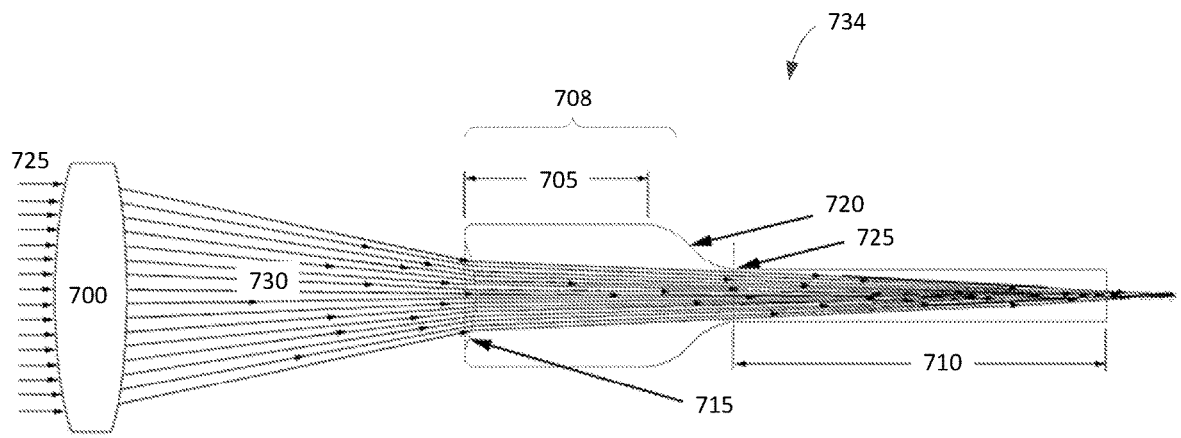
FIG. 7 illustrates one embodiment of the optical fiber termination.

As shown schematically in FIG. 7, which represents an embodiment of the invention, a laser's collimated light output 725 is shown to be converged, 730, by a single optic (which is typical in the art of surgical lasers; shown here as a lens 700) and focused onto an input curved facet of an optical fiber system 734, which materially and optically combines the conventional surgical fiber 710 with an optical head region (the region of OF termination) 708. The optical head section is, substantially, a cylindrical body exhibiting substantially the same material structure as the fiber 710. Specifically, the head 708 has the axial core region and the co-axial glass cladding region (which could be imagined in a cross-sectional view) just like the optical fiber 710 with the exception that, in the optical head 708, both the dimension of the core and that of the glass cladding are proportionately expanded (increased, as compared to those of the fiber 710) to such values that the front/input surface of the head 708 could support the concave refracting surface 715 that, in turn, is dimensioned to substantially completely accept laser light in the focal spot formed by the converging beam 730 and to focus such light (upon refraction through the surface 715 into the optical head 708) onto the cross-sectional surface 725 of the structure 734, where the regions of spatially-expanded core and the spatially-expanded glass cladding of the head 708 end and the core and the glass cladding of the regular fiber 710 begin. The so-defined surface 725—that is, the surface beyond which, as seen from the head 708, the dimension(s) of the glass core region of the structure 734 and the dimension(s) of the glass cladding region of the structure 734 are substantially equal to those of the fiber 710—is defined as an input surface or facet of the fiber 710, at least for the purposes of the appended claims.

In at least one implementation—for example in the case when the head 708 is made from a preform from which the fiber 710 is drawn—the ratio of a thickness of the glass cladding region of the optical head 708 to the diameter of the core region of the optical head 708 is substantially equal to that of the fiber 710.

The lensing surface 715 is judiciously dimensioned to change—and, in this example—to reduce the rate of convergence of laser light upon traversing the surface 715. In the example of FIG. 7, the adiabatic merging between the optical head 708 and the conventional fiber 710 is shown to be carried out in a transition region or section 720 (which may optionally be considered to be a part of the head 708).

Throughout such transition region 720, both the diameter of the core portion of the head 708 (which is maintained to be substantially constant along at least a larger portion 705 of the head 708) and the diameter of the glass cladding of the head 708 (which is maintained to be substantially constant along at least the same portion 705) are gradually reduced toward the values of the diameter of the core and the diameter of the glass cladding of the fiber 710. At the surface 725, the core and glass cladding regions of the head 708 are seamlessly merged into, respectively, the core and glass claddings of the fiber 710, in a substantially tangentially-parallel fashion. (In other words, at the input surface of the fiber 710, a tangent to the surface of the core of the fiber and a tangent to the surface of the core of the transition region 710, both drawn in a plane containing the optical fiber axis are substantially co-incident with one another, while a tangent to the surface of the cladding of the fiber and a tangent to the surface of the cladding of the transition region 710, both drawn in the same plane containing the optical fiber axis, are also substantially co-incident with one another.)

Optionally, and in a related implementation, the cylindrical portion of the head 708 may be merged with the cylindrical body of the fiber 710 without a transition section—in a step-like fashion (in which case, understandably, there will be a spatial disconnect between the corresponding core regions and/or corresponding glass cladding regions of the portions 708 and 710 of the structure 734). In any case, the portion of the structure 734 preceding the fiber section 710 is configured such that, all the way throughout the axial extent of the structure 734 between the lensing surface 715 and the surface 725 (at which the body of the conventional fiber 710 begins), laser light coupled into the structure 734 through the surface 715 is continually and uninterruptingly converging. At the surface 725, the rate (or angle) of such convergence is configured to correspond to the accepting NA of the fiber 710. Optionally, such convergence may be effectuated at a substantially constant rate throughout the head 708.

Due to the fact that the materials of the core region and the glass cladding region—and, therefore, the indices of refraction of the core region and the glass cladding region—of the head 708 (with or without the transition section 720) are the same as those of the core and glass cladding regions of the fiber 710, there is no internal reflection of laser light coupled into and propagating through the structure 734.

Figure 4:
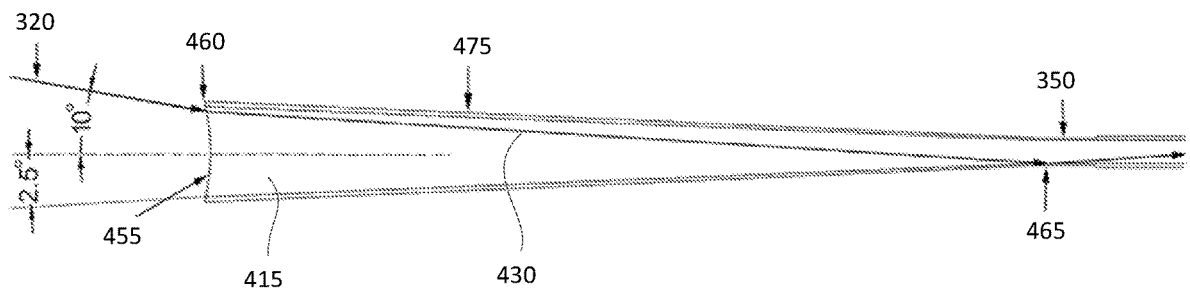
FIG. 4 presents the combination of the same taper input section (as that depicted in FIG. 3) but with a re-structured input facet, the operation of which affects propagation of a high order laser mode through the taper section such as to avoid the conversion to modes propagating at higher angles with respect to the optical axis (see, for example, U.S. Pat. No. 7,488,116)
Figure 5:
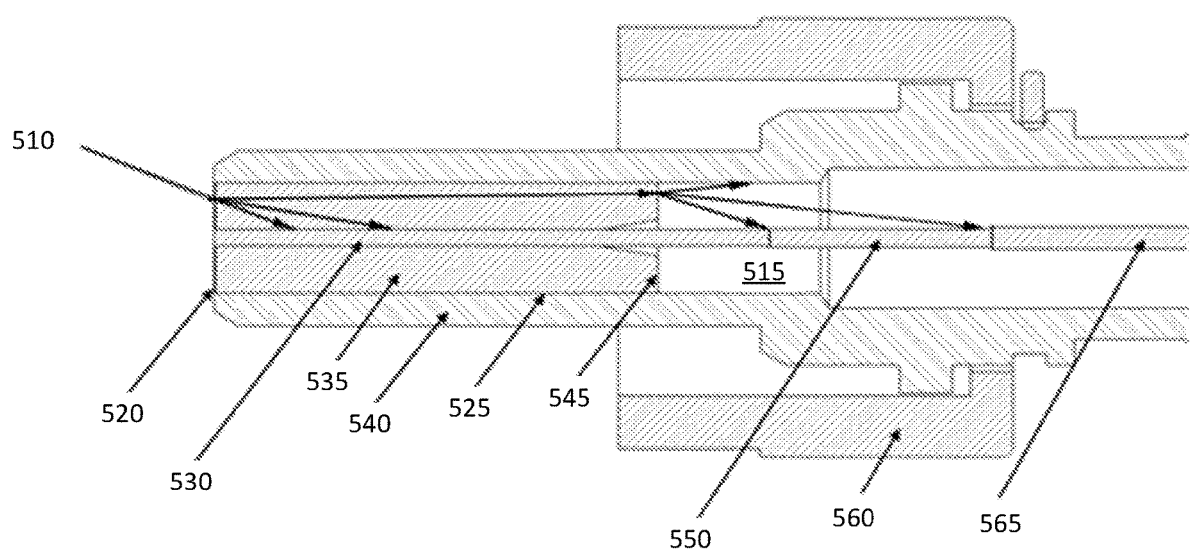
FIG. 5 illustrates a quartz ferrule sleeved optical fiber termination with integral beam scattering elements (per Brown in U.S. Pat. No. 7,090,411)

A skilled artisan will readily appreciate that FIG. 7 depicts a construct configured such that various critical dimensions may be precisely maintained (as compared with inability of related art to do so) and—in particular—the absolute axial starting position, 725, of the core of the conventional, substantially-constant diameter and the axial position of the input surface 715. In practice, the dimensions of the head 708 (with or without the transition region 720) are easily maintained with high precision and compatible with focal lengths of the lens formed by the surface 715 that may be produced in the available glass materials, thereby—as compared with the embodiments similar to those of FIG. 3 and FIG. 4, for example—obviating the need for a tapered wall and, therefore, the need in a tapered section completely. Furthermore—and in comparison with an embodiment similar to that of FIG. 6—the contraption 734 does not require an accessory quartz ferrule (685, as in FIG. 6, that is fused 690 about the taper 695 to produce a larger surface upon which to form a functional lens).

Figure 8:
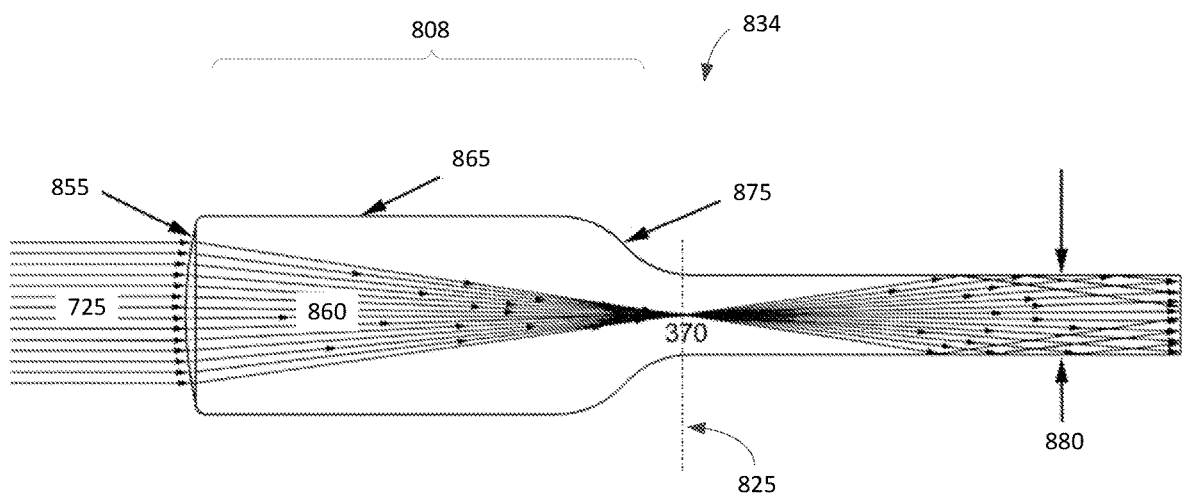
FIG. 8 depicts a related embodiment of the optical fiber termination.

FIG. 8 illustrates an embodiment related to that of FIG. 7. Specifically, FIG. 8 depicts an embodiment of the optical fiber structure 834 containing an OF termination (section 808) configured to couple laser light, into a conventional surgical fiber 880, at a power level that would otherwise damage the input surface of the fiber 880 is such laser light were focused on the input surface directly; or at a power level that would otherwise ionize the air around the fiber 880 if focused sufficiently to be coupled directly into the fiber 880. In this example, collimated laser beam 725 is acquired by the OF termination (head) portion 808 through its front surface (facing the laser source of light) that is dimensioned to define a convex lens element at such front surface and, having traversed the lensing surface 855, propagates through the body of the section 808 while converging towards the fiber section 880. (The skilled person will appreciate that the embodiment 834 is also configured to ensure that a degree of convergence of light, received and accepted at the front surface of the OF termination 808, is changed upon transmission through such front surface.)

The material configuration/structure of the head 808 at least in one case may be substantially similar to that of the head 708 (of FIG. 7). For example, at least along a larger portion 865 of the length of the section 808, the section 808 may be structured as a spatially-expanded version of the fiber 880 and dimensioned such that the waist of the spatially-converging (internally to the head 808) beam 860 that contains highest density of radiant power occurs within the body of the glass material (for example, at or near the diameter transition section 875. The transition section 875, if and when present, is preferably structured in a fashion similar to that discussed in reference to FIG. 7. The head region 808 is materially and optically merged with the fiber 880 at a surface 825 which, as was already alluded to above in reference to the surface 725 of FIG. 7, —is the input surface of the fiber 880, that is a surface beyond which, as seen from the head 808, the dimension(s) of the glass core region of the structure 834 and the dimension(s) of the glass cladding region of the structure 834 are substantially equal to those of the fiber 880. In at least in one specific implementation, the structure 834 is dimensioned such that, at the input surface of the optical fiber, the core of the termination element 808 and a core of the fiber 880 are co-axially merged with one another in a tangentially-parallel fashion, while the cladding of the termination element 808 and that of the fiber 880 cladding are also co-axially merged with one another in a tangentially-parallel fashion.

Figure 9:
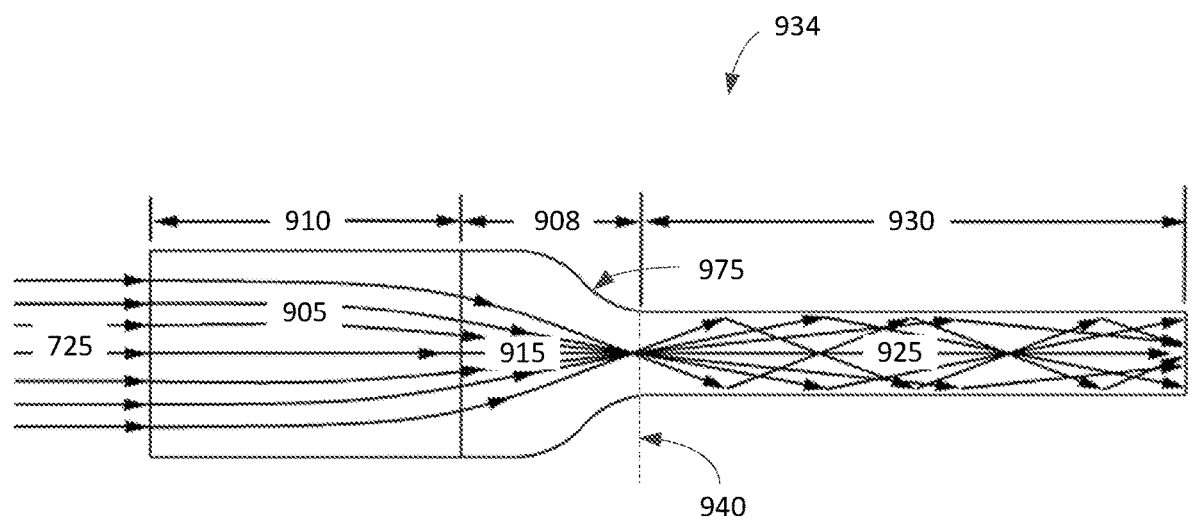
FIG. 9 depicts yet another related embodiment of the optical fiber termination.

A related implementation of the system 934, schematically illustrated in FIG. 9, provides an OF termination (to the surgical optical fiber 925) structured to include two main portions: a head 908 (having a core region and a glass cladding region, and fabricated in the same fashion the fiber 925 is fabricated, and structured as discussed above in reference to heads 708, 808 of FIGS. 7, 8) and a front bulk glass cylinder 910 configured as an accessory lens, in this case a Gradient Index lens (or GRIN lens), in ~¼ pitch length, fused with the head 908. The head 908 generally may or may not have a transition region at region of attachment to the fiber 910 and in the example of FIG. 9 such transition region is present, depicted as 975, and structured by analogy of transition regions 720, 875 described in reference to FIGS. 7, 8.

As shown, the input and substantially collimated light 725 is an output from the surgical laser (such as a holmium laser) with an $M^2$ factor on the order of about 25 or higher, which is accepted by the bulk lens 910 and converged through the head 908 into a beam waist 915. The gradient index lens portion is dimensioned to ensure that the waist 915 of the converging beam 905 is located at or near the diameter transition region 975 (when present) or at an input surface 940 of the optical fiber 925.

In at least one specific implementation, the structure 934 is dimensioned such that, at the input surface 940 of the optical fiber, the core of the head 908 and a core of the fiber 880 are co-axially merged with one another in a tangentially-parallel fashion, while the cladding of the head 908 and that of the fiber 880 cladding are also co-axially merged with one another in a tangentially-parallel fashion.

In at least one implementation of an embodiment of any of FIGS. 7, 8, and 9, the length of the head portion 708, 808, 908 of the optical fiber termination may be about 1.5 mm to about 5 mm in length (preferably, about 1.5 to about 3 mm in length) with an outer diameter of about 1 mm to about 2 mm (and the core diameter being about 80%, about 90%, or about 95% of the value of the outer diameter of the head, depending on the specifics of a particular implementation). The so-dimensioned optical termination facilitates the situation when laser light (during the process of converging inside the bulk of the head portion) substantially avoids interaction with a boundary between the glass core and glass cladding regions of the head portion—for example, no total internal reflection on such boundary occurs.

In one related embodiment, a fiber termination contraption includes an optical fiber having a terminus, adjacent to the terminus a clad fiber and distal from the terminus and adjacent to the clad fiber a polymeric-coated fiber. The clad fiber includes a silica core and an F-doped silica cladding and the polymeric-coating fiber includes the clad fiber carrying one or more polymeric coatings. The fiber termination also includes an expanded core section proximal to the unaltered fiber core, and clad. The transition from expanded core to unaltered core is abrupt such that modes entering the expanded core at angles unsupported by the fiber core-cladding NA are not guided, but leak in a generally distal direction.

In another related embodiment, a method for manufacturing an optical fiber termination includes providing an optical fiber with a denuded portion adjacent to a terminus; then forming an expanded section by controlled heating of the denuded glass fiber. The process may additionally include positioning overfill glass tube on denuded fiber section prior to expanding the core and cladding.

In yet another related embodiment, a method for manufacturing an optical fiber termination includes fusing a silica tube to a terminus of a clad fiber; and forming one or more furrows in an exterior surface of the silica tube.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

The invention claimed is:
1. An article of manufacture, comprising:
an optical fiber having a fiber core and a fiber cladding, and
an optical termination element in contact with an input surface of the optical fiber, the optical termination element having a front surface, a termination core, and a termination cladding,
wherein a first ratio of a termination core diameter to a termination cladding diameter is substantially equal to a second ratio of a fiber core diameter to the fiber cladding diameter,
wherein the article of manufacture is configured to receive an input beam of laser light having an $M^2$ factor of 25 or higher at the front surface of optical termination element and to converge said input beam upon propagation inside the optical termination element while not totally internally reflecting said laser light at a boundary between the termination glass core and termination glass cladding, wherein the article of manufacture is configured to satisfy one or more of the following multiple conditions:

(i) to accept said input beam of laser light at the front surface and transmit said input beam through the front surface into the optical termination element while changing a degree of convergence of the beam upon transmitting thereof through the front surface; and (ii) to converge the input beam of laser light, received at the front surface of the optical termination element, internally within the optical termination element such as to focus said input beam at a surface in which the termination core and the fiber core have substantially equal dimensions and the termination cladding and the fiber cladding have substantially equal dimensions; and (iii) to transmit the input beam of laser light through an optical lens, wherein the optical lens is a part of the optical termination element and is separated from the optical fiber by a portion of the optical termination element containing said termination core and termination cladding.

2. An article of manufacture according to claim 1, wherein the optical termination element has a length along which the first ratio is substantially constant and a portion having different refractive index at different radial distances from an axis of said portion.

3. An article of manufacture according to claim 1, wherein at least one of the following conditions is satisfied:

(18a) the optical termination element contains an optical lens component;

(18b) the front surface of the optical termination element is a surface of said optical lens component;

(18c) the article further comprises an auxiliary optical element affixed to the front surface of the optical termination element; and (18d) the front surface is a curved surface.

4. An article of manufacture according to claim 1, wherein, at the input surface of the optical fiber, the termination core and a fiber core are co-axially merged with one another in a tangentially-parallel fashion, and the termination cladding and a fiber cladding are co-axially merged with one another in a tangentially-parallel fashion.

5. A method comprising:

directing an input beam of laser light having an $M^2$ factor of 25 or higher in air to the front surface of the optical termination element of the article of manufacture according to claim 1;

upon transmitting said input beam through the front surface, spatially concentrating said input beam inside the optical termination element to form a converging beam while propagating said converging beam towards the input surface; and coupling light from said converging beam into the optical fiber through the input surface.

6. A method according to claim 5, wherein said coupling includes forming a waist of the converging beam in a glass material.

7. A method according to claim 5, wherein said spatially concentrating is devoid of total internal reflection of the laser light at a boundary between the termination core and termination cladding.

8. A method according to claim 7, wherein said transmitting the input beam through the front surface of the optical termination element includes transmitting said beam through a surface of a lens.

9. A method according to claim 8, comprising one of the following:

(34a) directly coupling said input beam from air to the optical termination element through said front surface that separates air from a material of the optical termination element; and (34b) coupling said input beam from air to an auxiliary glass element that is in contact with the optical termination element at the front surface thereof.

10. A method according to claim 5, wherein said transmitting the input beam through the front surface of the optical termination element includes transmitting said beam through a surface of a lens.

11. A method according to claim 10, wherein the front surface of the optical termination element is said surface of a lens.

12. A method according to claim 10, wherein said lens in a gradient index lens.

13. A method according to claim 5, comprising one of the following:

(27a) directly coupling said input beam from air to the optical termination element through said front surface that separates air from a material of the optical termination element; and (27b) coupling said input beam from air to an auxiliary glass element that is in contact with the optical termination element at the front surface thereof.

14. A method according to claim 5, wherein said spatially concentrating the input beam inside the optical termination element includes converging the input beam inside the optical termination element that has the termination cladding diameter of at least 0.5 mm.

15. A method according to claim 5, wherein said transmitting the input beam through the front surface of the optical termination element includes transmitting at least 90% of a power carried by the input beam through the front surface of the optical termination element.

16. A method according to claim 5, wherein the spatially concentrating said input beam inside the optical termination element is devoid of propagating light from said input beam through an optical taper.

17. A method according claim 5, wherein the termination core and the fiber core are both made from a first material, and wherein the termination cladding and the fiber cladding are both made from a second material.

18. An article of manufacture according to claim 1, wherein the front surface is a surface configured to reduce a rate of convergence of light of the input beam upon propagation of the input beam therethrough.

19. An article of manufacture according to claim 1, wherein the article is configured to converge light of said input beam inside the optical termination element without propagating said light through an optical taper.

* * * * *